Figure 1:
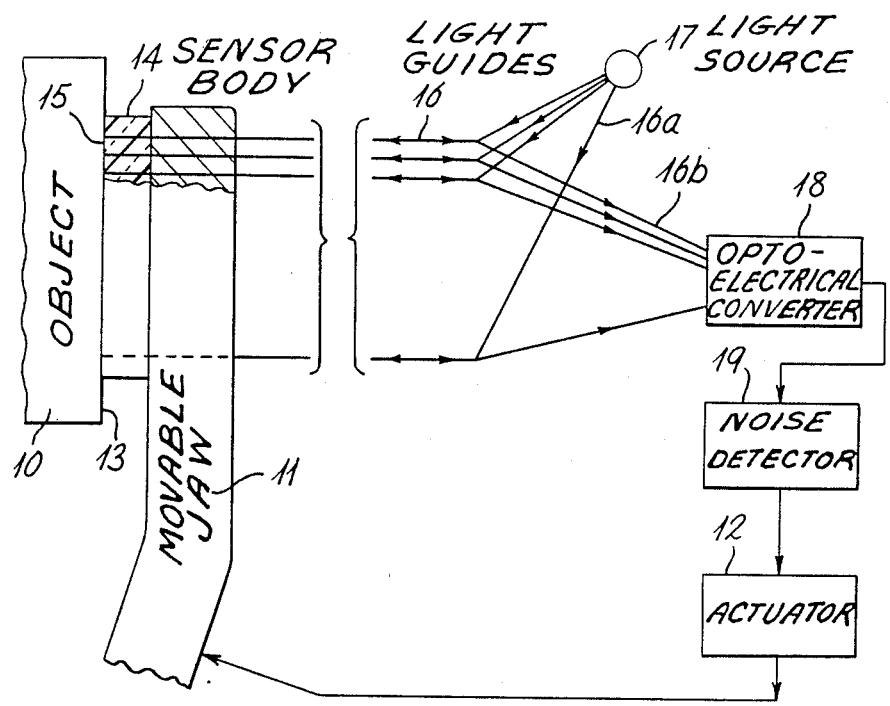

United States Patent [19]

Beck et al.

[11] Patent Number: 4,752,682

[45] Date of Patent: Jun. 21, 1988

[54] SLIPPAGE SENSORS FOR OBJECT-GRIPPING MECHANISMS IN AUTOMATED MACHINERY

[75] Inventors: Maurice S. Beck; Barry E. Jones, both of Altrincham; Frank Kvasnik, Stockport, all of England

[73] Assignee: National Research Development Corporation, London, United Kingdom

[21] Appl. No.: 865,830

[22] Filed: May 22, 1986

[30] Foreign Application Priority Data

May 30, 1985 [GB] United Kingdom ............... 8513648

[51] Int. Cl.$^4$ .................... B25J 15/00; G01L 1/24
[52] U.S. Cl. .................... 250/227; 250/225; 250/231 P; 901/47
[58] Field of Search ............. 250/227, 231 P, 225; 901/33, 34, 47; 73/705, 800

[56] References Cited

U.S. PATENT DOCUMENTS

| | | | |
|---|---|---|---|
| 3,904,234 | 9/1975 | Hill et al. .................. | 250/231 P |
| 4,439,674 | 3/1984 | Amberny et al. .......... | 901/47 |
| 4,556,791 | 12/1985 | Spillman, Jr. ............. | 250/225 |
| 4,593,191 | 6/1986 | Alles ......................... | 901/47 |

FOREIGN PATENT DOCUMENTS 0093545 11/1983 European Pat. Off. .
0146522 6/1985 European Pat. Off. .
1062967 3/1967 United Kingdom .
1111119 4/1968 United Kingdom .

OTHER PUBLICATIONS

Schneiter et al., "An Optical Tactile Sensor for Manipulators", Robotics & Computer-Integrated Manufacturing, vol. 1, No. 1, pp. 65–71, 1984.

Primary Examiner—Edward P. Westin
Attorney, Agent, or Firm—Cushman, Darby & Cushman

[57] ABSTRACT

A slippage sensor comprises a light-transmissive elastic component (14) defining an object-contactor face (15), input and output light guide (16a, 16b) defining a light transmission path through the component, and an indicator (19) connected with the output guide to detect transmission variations caused by elastic deformation of the component due, in turn, to relative slipping movement of an object (10) contacted thereby. In one form of sensor the input/output guides define a light path discontinous at the contactor face and to be completed by a surface (13) of the object as a reflector. In another form the component carries a reflector deformable therewith. In a further form the component is photoelastic and the input/output guides include polarisers. The sensor is useful to indicate when a minimum object gripping force is attained or it can indicate object characterisation.

12 Claims, 2 Drawing Sheets

SLIPPAGE SENSORS FOR OBJECT-GRIPPING MECHANISMS IN AUTOMATED MACHINERY

In various situations involving automated machinery it is desirable to grip an object with the minimum possible force to avoid slipping during movement of the gripped object. The use of existing force feedback systems to control the grip in such a situation is not satisfactory in general terms because these systems rely on a presetting of the gripping force to be deployed. This leads to the possibility, particularly where a plurality of similar, but not necessarily identical, objects are to be gripped in sequence, that the grip may be too relaxed for any individual relatively slippery object of the sequence whereby that object is handled inappropriately or dropped, or the grip may prove excessive for any individual relatively weaker object of the sequence and so cause undesired deformation or breakage of that object.

The present invention seeks to avoid this possibility by avoiding the necessity for presetting of the gripping force. To this end the invention centers on the provision of a slippage sensor operable to provide an indication of relative slipping movement of an object contacted thereby. In use, such a sensor is applicable to a gripping mechanism to indicate, during operation to close about and move an object, when slippage of the object first ceases and in this way the minimum non-slip gripping force is determined on an object-to-object basis.

According to the invention there is provided for this purpose a slippage sensor comprising a light-transmissive elastic component defining an object-contactor face, input means for applying light to said component, output means defining with said input means a light transmission path through said component, and slippage indicator means operably connected with said output means and responsive to light transmitted along said path to detect variations therein caused by elastic deformation of said component due, in turn, to relative slipping movement of an object contacted thereby.

In a first form of the proposed sensor the component is constituted simply by a body of light-transmissive elastic material, and the input and output means define respective portions of the light path which extend to and from the contactor face with such portions being discontinuous at the face. This form of sensor relies on the use of an object to be contacted as a reflector to couple the light path portions, and the fact that the effectiveness of this coupling is critically dependent on the relative dispositions of the object and component body when very close together. In practice, when such a sensor contacts the object and slippage occurs, light transmission to the output means will undergo oscillatory and random variations due to resultant juddering of the component and changes in the reflective nature of the contacted surface across which slippage occurs. These variations are sufficient to permit selective detection of the same at an appropriate form of the indicator and such detection can be deployed to command an increase in gripping force until terminated. When this last situation is attained the object is gripped with the minimum force to avoid slippage and, moreover, this force is aided by the stiction which is then effective to enhance the restraint against movement.

A shortcoming of this first form of sensor is that it is not applicable with all manner of object surfaces and such a sensor is, in any case, open to progressive contamination of its contactor face by dust or other foreign material with resultant adverse impact on the coupling capability of an object to be gripped.

These disadvantages are obviated by a second form of sensor according to the invention wherein the component itself carries light reflective material deformable therewith and serving to couple the input and output means within the component. In simpler embodiments of this form of sensor a single sheet reflector is employed, while other embodiments can involve a plurality of discrete small reflective elements distributed within the component.

In a third form of the invention, which is also independent of the coupling capability of an object to be gripped, the component comprises a body of photoelastic material deformable therewith and located in the light path between the input and output means, while the last-mentioned means respectively include means for polarising light entering and emergent from the photoelastic body.

It is evident that use of the proposed sensor will involve association with some means to indicate when the sensor first contacts, or becomes located very close to, an object to be gripped, and the sensor itself can form part of this means.

Figure 2:
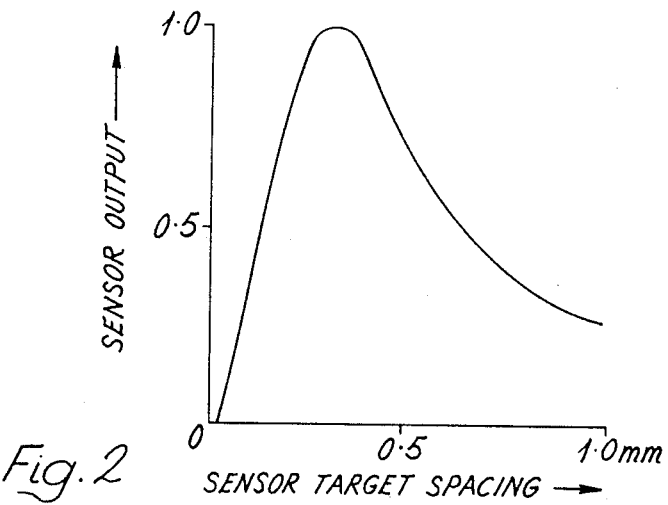
Figure 3:
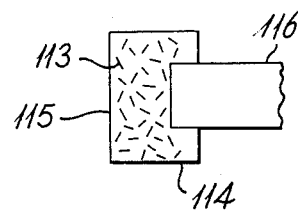
Figure 4:
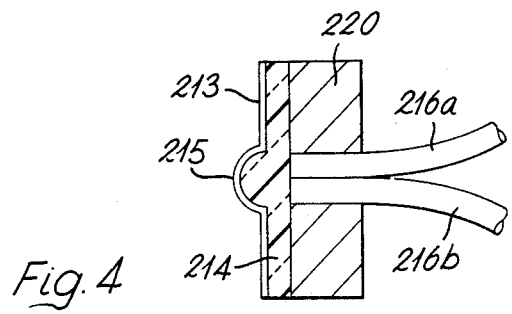
Figure 5:
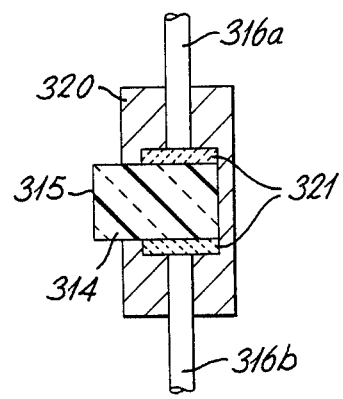
Figure 6:
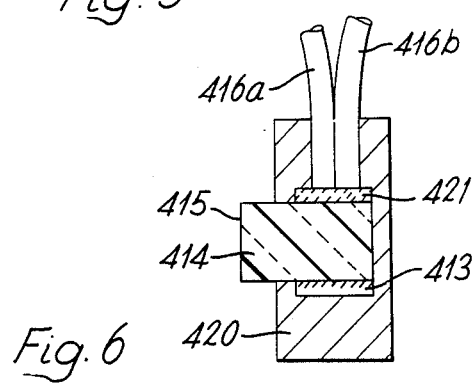

A further understanding of the invention as so far described will be gained by consideration of different embodiments thereof given by way of example and illustrated in the accompanying drawings, in which:

FIG. 1 schematically illustrates a gripping mechanism incorporating one embodiment of the first form of sensor according to the invention, FIG. 2 graphically illustrates an operating characteristic of the sensor of FIG. 1, FIGS. 3 and 4 respectively schematically illustrate different embodiments of the second form of sensor according to the invention, FIG. 5 similarly illustrates an embodiment of the third form of sensor according to the invention, and FIG. 6 schematically illustrates a sensor embodiment according to both the second and third forms of the invention.

Before more detailed consideration of the drawings, it is appropriate to note that the various embodiments of the invention comprise elements having a corresponding function from one embodiment to another and that the same reference numeral is used for each such element subject to the addition or increase of a hundreds digit.

Considering now the apparatus of FIG. 1: this involves a sensor embodiment of the first form mentioned above, such sensor being used in association with an object 10, a gripping mechanism of which a movable jaw or equivalent member is denoted at 11, and an actuator 12. The actuator 12 is intended to represent motive means and associated controls for moving the gripping mechanism, together with the object 10 when gripped, in a desired manner. Among its operations, the actuator is effective to move the member 11 and sensor into and out of contact with the adjacent object surface 13 respectively to grip and release the object. During progression of the gripping movement an additional movement is effected to traverse the sensor across the surface 13 in a test for non-slipping contact. This additional movement can be effected cyclically between increments of a stepped gripping movement, or both movements can be continuous within close proximity to the object.

The sensor of FIG. 1 comprises a component in the form of a unitary body 14 of material which is light-transmissive and elastic. This body is secured to the member 11 to face the object surface 13 and, upon appropriate closure movement of member 11, to engage the latter with its own outermost exposed surface portion which defines a contactor face 15.

The input and output means of this sensor include light guides 16, suitably of multiple fiber optic form, extending through the body 14 to terminate at one set of corresponding ends at the contactor face 15. In a simple view, one sub-set 16a of the guides are coupled at their other ends with a light source 17 to transmit light to the face 15, while the remaining sub-set 16b of the guides convey light received at the face 15 to an optoelectrical converter 18. In fact in practice the guides need not be discretely divided into sub-sets, but can serve to transmit and receive through the body 14 in a bidirectional mode by use of appropriate coupling from and to the source 17 and converter 18.

It will be appreciated that normally, when the object surface 13 is other than of polished light-reflective quality, there will be no significant receipt by the guides 16 of light transmitted by those guides when the object and sensor are spaced. In these spaced circumstances the received light is substantially wholly dependent upon the ambient conditions and so will be generally uniform or regular. However, when the sensor and object are positioned very close to mutual contact, the ambient lighting conditions are of reduced impact and light receipt at the guides arises significantly from reflection by the object of the guide-transmitted light, with the effectiveness of this reflective coupling being critically dependent upon the sensor-to-object separation. This last coupling effect is shown by way of FIG. 2 which typifies the normalized light output characteristic from a closely spaced transmitting/receiving fiber pair at a separation of up to 1 mm from a light-reflective rough surface. These comments explain the basis for the operation of the first form of sensor as described earlier above, because slipping contact between the body 14 and object 10 will clearly produce variations of light output within the characteristic form of FIG. 2 as the sensor judders and the traversed object surface geometry itself changes, which variations occur in a locally differential manner over the sensor/object interface at any time.

In any event an electrical representation of the light output of the sensor is applied by the converter 18 to a slippage indicator in the form of a noise detector 19 serving to signal whether or not variations of the kind denoting slippage are present. A suitable noise detector for this purpose can incorporate a filter which selectively passes frequency components corresponding to slip variations, a rectifier with smoothing time constant compatible with transient discontinuities which may occur during slippage, and a Schmidt trigger providing a binary output denoting the presence or not of slippage. This last output is applied, in turn, to the actuator to activate the same for gripping mechanism closure about the object until slippage terminates.

As indicated earlier, this slippage sensing operation will normally be conducted when the sensor first contacts, or is very close to, the object to be gripped. Clearly any suitable form of contact indicator or proximity gauge can be employed for this purpose during an initial relatively coarse closure movement of the gripping mechanism. However there can equally clearly be advantage in employing the slippage sensor itself to indicate when close proximity or initial contact occurs if this is practicable. In the case of the sensor of FIG. 1 such an additional function is considered practicable by virtue of the characteristic of FIG. 2 which relates the sensor output, when normalized, with the sensor-to-target surface spacing and which shows that there will be a rapid decline in light output as the sensor approaches very closely to contact with the object.

Turning to FIGS. 3 and 4: these illustrate embodiments of the second form of the invention.

In FIG. 3 the sensor is the same as that of FIG. 1 except that the guides 116 do not extend wholly through the body 114 to the contactor face 115, and the body incorporates a plurality of discrete reflective elements 113 distributed therein between the face 115 and the neighboring ends of the guides 116. Clearly in this case, slippage with object-contact will give rise to light output variations as a result of juddering and associated movement of the elements 113, which variations will not otherwise occur. Also, it is to be noted that initial contact with an object will be detectable by a related change in light output as the sensor deforms and its elements 113 move.

In FIG. 4 a single reflector 213 of sheet form is located across the contactor face 215 of the body 214 which, in this case, is mounted on a non-elastic base 220 carrying the guides 216. It will be noted that the face 215 has a protuberant shaping to enhance sensitivity. Also the guides 216 are shown as separate transmitting and receiving fiber optic bundles 216a and 216b. In a modification of this embodiment the reflector 213 is located across the inner surface of the body 214, between this body and the base, and over an aperture in the base allowing movement of the reflector together with distortion of the body.

In the sensor of FIG. 5 the body 314 is made of photoelastic material and is moutned at one end portion between like polarizers 321 within a non-elastic base 320 from which the other end portion of the body projects to define the contactor face 315. Light guides 316 in the form of separate transmitting and receiving bundles 316a and 316b are connected in the base 320 to terminate respectively adjacent the polarizers 321. In conditions of slipping object contact the body 314 will be varyingly stressed as a result of judder and so correspondingly vary the light output. Also, it is to be noted that initial contact with an object will be detectable by a related change in light output as the body is deformed and stressed.

The sensor of FIG. 6 is similar to that of FIG. 5 but employs a reflector 413 to couple the light transmission path through the photoelastic body 414 by way of a common input/output polarizer 421.

Although, as indicated by the opening discussion above, the sensor of the present invention has been conceived and developed primarily to facilitate manipulation of an object by enabling that object to be gripped with the minimum possible force to avoid slipping during movement of the gripped object, the sensor can have alternative or additional practical application. This possibility arises from the fact that the 'slip' signal produced by the sensor, at detector 19, in determining the minimum gripping force for an object is a strong function of the roughness of the object surface contacted by the sensor and so the sensor can be used to determine the texture of that surface and possibly, on the basis of such determination, to effect object recognition.

We claim:

1. A slippage sensor comprising a light-transmissive elastic component defining an object-contactor face, input means for applying light to said component, output means defining with said input means a light transmission path through said component, and slippage indicator means, including a noise detector, operably connected with said output means and responsive to light transmitted along said path to detect frequency variations therein caused by elastic deformation of said component due, in turn, to relative slipping movement of an object contacted thereby.

2. A sensor according to claim 1 wherein said component includes a body of light-transmissive elastic material, and said input and output means define respective portions of said path which extend to and from said contactor face, with such portions being discontinuous at such face.

3. A sensor according to claim 1 wherein said component includes a body of light-transmissive elastic material carrying light reflector means deformable therewith, said reflector means lying in said path to complete the same.

4. A sensor according to claim 3 wherein said reflector means comprise a plurality of discrete light reflector elements distributed within said body.

5. A sensor according to claim 3 wherein said reflector means is of sheet form located on a surface of said body.

6. A sensor according to claim 5 wherein said sheet reflector means defines said contactor face.

7. A sensor according to claim 1 wherein said component includes a body of photoelastic material, and said input and output means include light polarizer means.

8. A sensor according to claim 1 wherein said input and output means include light guides of fiber optic form.

9. A sensor according to claim 1 comprising proximity indicator means operably connected with said output means and responsive to light transmitted along said path to detect variations therein due to close proximity and/or contact of said contactor face with an object to be gripped.

10. A sensor according to claim 1, wherein said noise detector includes a filter operable to selectively pass signal components representing said frequency variations.

11. A method of using a slippage sensor of the type including:

a light-transmissive elastic component defining an object-contactor face, input means for applying light to said component, output means defining with said input means a light transmission path through said component, and slippage indicator means, including a noise detector, operably connected with said output means and responsive to light transmitted along said path to detect frequency variations therein caused by elastic deformation of said component due, in turn, to relative slipping movement of an object contacted thereby, said method comprising the steps of:

deploying the sensor in a progressive object-gripping operation by way of movement giving rise to said variations, and terminating said operation upon first cessation of said variations.

12. A method of using a slippage sensor of the type including a light-transmissive elastic component defining an object-contactor face, input means for applying light to said component, output means defining with said input means a light transmission path through said component, and slippage indicator means, including a noise detector, operably connected with said output means and responsive to light transmitted along said path to detect frequency variations therein caused by elastic deformation of said component due, in turn, to relative slipping movement of an object contacted thereby, said method comprising the steps of:

deploying said sensor in an object characterization operation involving the generation of said variations due to relative slipping movement between the sensor and an object, and characterizing said object in dependence on said variations.

* * * * *